(12) United States Patent
Diaz

(10) Patent No.: US 9,445,685 B1
(45) Date of Patent: Sep. 20, 2016

(54) APPARATUS FOR STEAMING TAMALES

(71) Applicant: Jose M. Diaz, Houston, TX (US)

(72) Inventor: Jose M. Diaz, Houston, TX (US)

( * ) Notice: Subject to any disclaimer, the term of this patent is extended or adjusted under 35 U.S.C. 154(b) by 181 days.

(21) Appl. No.: 14/250,561

(22) Filed: Apr. 11, 2014

Related U.S. Application Data

(60) Provisional application No. 61/811,255, filed on Apr. 12, 2013.

(51) Int. Cl.
*A47J 37/12* (2006.01)
*A47J 27/04* (2006.01)

(52) U.S. Cl.
CPC ........... *A47J 27/04* (2013.01); *A47J 2027/043* (2013.01)

(58) Field of Classification Search
CPC ...... A47J 27/04; A47J 36/22; Y10S 220/912
USPC .......... 99/339, 413, 416, 417, 418, 427, 441
See application file for complete search history.

(56) References Cited

U.S. PATENT DOCUMENTS

| | | | | |
|---|---|---|---|---|
| 2,138,908 | A * | 12/1938 | Douthitt | A47J 27/04 126/369 |
| 2,552,983 | A * | 5/1951 | Lee | A61L 2/26 211/181.1 |
| D288,053 | S * | 2/1987 | Maza | D7/704 |
| 5,195,424 | A * | 3/1993 | Guajaca | A47J 27/04 126/348 |
| D507,702 | S * | 7/2005 | Compagnucci | D3/306 |
| D599,167 | S * | 9/2009 | Tiemann | D7/409 |
| 2010/0136194 | A1* | 6/2010 | Schutte | A47J 36/22 426/510 |

* cited by examiner

*Primary Examiner* — Thien S Tran
(74) *Attorney, Agent, or Firm* — Egbert Law Offices, PLLC

(57) ABSTRACT

An apparatus for steaming at least one tamale has a top rack with a plurality of openings formed therein and extending in a generally horizontal orientation, a bottom rack having a plurality of openings formed therein and extending in a generally horizontal orientation in spaced relation to the top rack, and at least one leg extending downwardly from the bottom rack so as to support the bottom rack a desired distance above an underlying surface. Each of the plurality of openings of the bottom rack has an area less than an area of each of the plurality of openings of the top rack. A handle is affixed to at least one of the top rack and the bottom rack. The handle has a gripping portion extending above the top rack.

13 Claims, 3 Drawing Sheets

US 9,445,685 B1

APPARATUS FOR STEAMING TAMALES

CROSS-REFERENCE TO RELATED APPLICATIONS

The present application claims priority from U.S. Provisional Patent Application Ser. No. 61/811,255, filed on Apr. 12, 2013, and entitled "Tamale Steamer Apparatus".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to various forms of cooking apparatus. More particular, the present invention relates to apparatus that are useful for the steaming of tamales. Additionally, the present invention relates to apparatus that facilitate the ability to efficiently steam tamales.

2. Description of Related Art Including Information Disclosed Under 37 CFR 1.97 and 37 CFR 1.98

A tamale is a traditional Latin American dish made of masa (a dough, usually corn-based), which is steamed or boiled in a leaf wrapper. The wrapping is discarded before eating the tamale. Tamales can then be filled with meats, cheese, fruits, vegetables, chilies or any preparation according to taste. Both the filling and the cooking liquid may be seasoned.

Traditionally, tamales have been prepared in a tamalera. This tamalera is a pan having a bottom surface with openings formed therein. Water can be introduced into a lower pan, below the holes so as to allow boiling water and to produce steam for the steaming of the tamales that are arranged in a pyramid-shaped pattern within the interior of the pan. Conventionally, the tamales in the tamalera will be overlying each other, stacked, pressing against one another, and arranged in a rather tight bundle. As such, it has been very difficult for steam to effectively contact all of the surfaces of each of the tamales within the tamalera. Often, certain tamales within the interior of the tamalera will be somewhat cool and not effectively steamed. Those portions of the tamales that receive a large amount of the steam may become overcooked. Often, the bottom edges of the husk that is used to wrap the tamales can become burnt. As such, they will tend to stick together when they are removed from the tamalera. As such, a need is developed so as to provide a tamale steamer that effectively steams the tamales arranged within the steamer in a consistent, effective and efficient manner.

In the past, a variety of patents have issued relating to food steaming devices. For example, U.S. Pat. No. 5,195,424, issued on Mar. 23, 1993 to N. B. Guajaca, is a tamale steamer. This tamale steamer is generally in the form of a tamalera. This steamer has a rack capable of supporting the tamales at an inclined orientation. The rack is provided with a number of horizontal tiers or assemblies each constructed of rings joined by radially-positioned spokes. Corresponding rings within each of the rack's assemblies increase in size from the top to the bottom of the rack so as to establish conically-shaped surfaces upon which the comestibles are then positively supported at an incline. The spokes connecting the rings at each of the assemblies are vertically-oriented one above the other and divide the racks into separate receptacles for segregating food during cooking Two or more racks may be stacked within the steamer's open-top vessel so as to increase the cooking capacity.

U.S. Pat. No. 6,167,799, issued on Jan. 2, 2001 to M. A. Macias, teaches a tamale and vegetable steaming device. This steaming device has a cylindrical pot portion having an open upper end and a closed lower end. A cylindrical insert is positionable within the cylindrical pot portion. The cylindrical insert has an open upper end, a closed lower end, and a cylindrical side wall therebetween. The cylindrical side wall has a plurality of apertures therethrough in a spaced relationship. The insert is positionable within the pot portion whereby the closed lower end of the insert is elevated above the closed lower end of the pot portion. The insert has a flattened arc portion extending a height thereof. The flattened arc portion creates a separation between the insert and the pot portion whereby water can be added to the pot portion through the separation.

U.S. Design Pat. No. D547,602, issued on Jul. 31, 2007 to Yamasaki et al., shows a steaming plate for a rice cooker. This streaming plate has a plurality of large openings and several small apertures formed therethrough. The feet associated with the large openings are suitable for allowing steam to pass through the openings in the plate for the steaming of rice.

U.S. Design Pat. No. D607,265, issued on Jan. 5, 2010 to M. Gaunaurd, shows a food steamer in which a pot is provided having a base having a plurality of holes formed therein. The base is located above a pan portion. As such, water can be placed into the pan portion so that, upon boiling, steam will pass outwardly through the openings at the bottom of the pot.

U.S. Pat. No. 4,739,698, issued on Apr. 26, 1988 to P. M. Allaire, discloses an apparatus for steaming food. Food suspended within a compartment of the apparatus is cooked by steam rising from a reservoir of boiling water below. After passing through the food compartment, steam collects in a dome-shaped lid where it condenses to water and then flows by means of a gutter device below the lid into channels along the food compartment walls in order to return to the reservoir without contacting the food.

U.S. Pat. No. 4,982,656, issued on Jan. 8, 1991 to E. Stone, describes a steamer having a food tray with a stepped sidewall to provide a subjacent section of lesser cross-sectional area than its upper section. An internal cover is received within the upper section of the food tray and it is slidably received against the interior sidewalls of the upper section so as to permit adjustment of its level in the upper section whereby the volume of the food compartments beneath the internal cover can be fixedly adjusted. The steaming vessel also has an exterior cover that has a hot plate with peripheral downwardly dependent side walls which are received within the open upper edges of the food tray.

U.S. Pat. No. 5,816,139, issued on Oct. 6, 1998 to G. Scorta Paci, describes a steam cooking device that has a pot-like body defining a space for containing food. The body has a central chimney-like projection with one or more holes at its upper end for the passage of steam and an obturator for controlling the diffusion of the steam. In use, the device is fitted in the top of a pan containing a certain amount of water and is closed at the top by a lid. The steam produced during the heating of the water is diffused, to an extent which can be regulated by the obturator, through the hole in the chimney-like projection into the space in which the food is disposed.

U.S. Pat. No. 5,865,104, issued to Sham et al., provides a food steamer that has a base unit that supports a removable food steaming cabinet and a removable adjacent water supply tank. The food steamer appliance also features automatic water flow regulation from the water supply tank, and continual steam supply from the base unit.

U.S. Pat. No. 8,025,007, issued on Sep. 27, 2011 to R. L. Boyer, teaches a turkey fryer with vertically stacking cooking racks. A pot-shaped basket is provided with a plurality of stackable cooking racks. The stackable cooking racks have flat screen bodies and spaced handles which project vertically from the screens and which concomitantly provide a loop for handling each rack and for spacing apart adjacent stacked racks. A bottommost cooking rack further includes feet which raise the bottommost rack's screen above a bottom wall of the basket when inserted therein.

It is an object of the present invention to provide a tamale steamer apparatus that can efficiently and effectively steam tamales.

It is another object of the present invention to provide a tamale steamer apparatus which effectively supports the tamales in a vertical orientation in generally spaced relationship to each other.

It is a further object of the present invention to provide a tamale steamer apparatus that can be easily placed into a pan of water.

It is a further object to the present invention to provide a tamale steamer apparatus which is stackable so as to increase capacity.

It is a further object to the present invention to provide a tamale steamer apparatus which assures that the husk of the tamale remains closed during the steaming process.

It is a further object of the present invention to provide a tamale steamer apparatus which effectively retains the juices of the tamale within the husk during the steaming process.

It is a further object of the present invention to provide a tamale steaming apparatus which avoids any burning or charring of the husk or any overcooking of the tamale.

It is still a further object of the present invention to provide a tamale steamer apparatus which is easy to use, easy to manufacture and relatively inexpensive.

These and other objects and advantages of the present invention will become apparent from a reading of the attached specification and appended claims.

BRIEF SUMMARY OF THE INVENTION

The present invention is an apparatus for steaming at least one tamale. The apparatus comprises a top rack having a plurality of openings formed therein and which extends in a generally horizontal orientation, a bottom rack having a plurality of openings formed therein and also extending in a generally horizontal orientation, and at least one leg extending downwardly from the bottom rack so as to support the bottom rack a desired distance above an underlying surface. Each of the plurality of openings of the bottom rack has an area less than an area of each of the plurality of openings of the top rack.

A central rack is provided so as to extend in a generally horizontal orientation in a location between the top rack and the bottom rack. The central rack also has a plurality of openings formed therein. Each of the plurality of openings of the central rack has an area greater than an area of each of the plurality of openings of the bottom rack. Also, a pan can be positioned below the bottom rack. The leg of the bottom rack abuts a surface of the pan so as to suspend the bottom rack a desired distance above the surface of the pan.

The area of each of the plurality of openings of the top rack is greater than a cross-sectional area of the tamale. The area of each of the plurality of openings of the bottom rack is less than a cross-sectional area of the tamale.

The top rack includes a perimeter member and a plurality of wires extending across the perimeter member in a cross-hatched configuration. The bottom rack also has a perimeter member with a plurality of wires extending across the perimeter member in a cross-hatched configuration.

A plurality of supports extend in a vertical orientation between the top rack and the bottom rack so as to maintain the top and bottom racks in spaced parallel relation to each other. The at least one leg includes a plurality of legs that extend downwardly from the bottom rack. The plurality of legs are positioned adjacent to a perimeter of the bottom rack.

A handle is affixed to at least one of the top rack and the bottom rack. The handle has a gripping portion extending above the top rack. The handle includes a first vertical member having a hook at a lower end thereof and a second vertical member having a hook at a lower end thereof. The first vertical member is in spaced parallel relation to the second vertical member. The first and second vertical members are connected to the gripping portion. The handle also includes a first bent portion formed at an upper end of the first vertical member and an first angled portion extending from the first bent portion to the gripping portion. A second bent portion is formed at an upper end of the second vertical member. A second angled portion extends from the second bent portion toward the gripping portion. As such, the handle can be removably affixed to the top rack so as to allow for the lifting of the top and bottom racks from the pan.

DETAILED DESCRIPTION OF THE INVENTION

Figure 1:
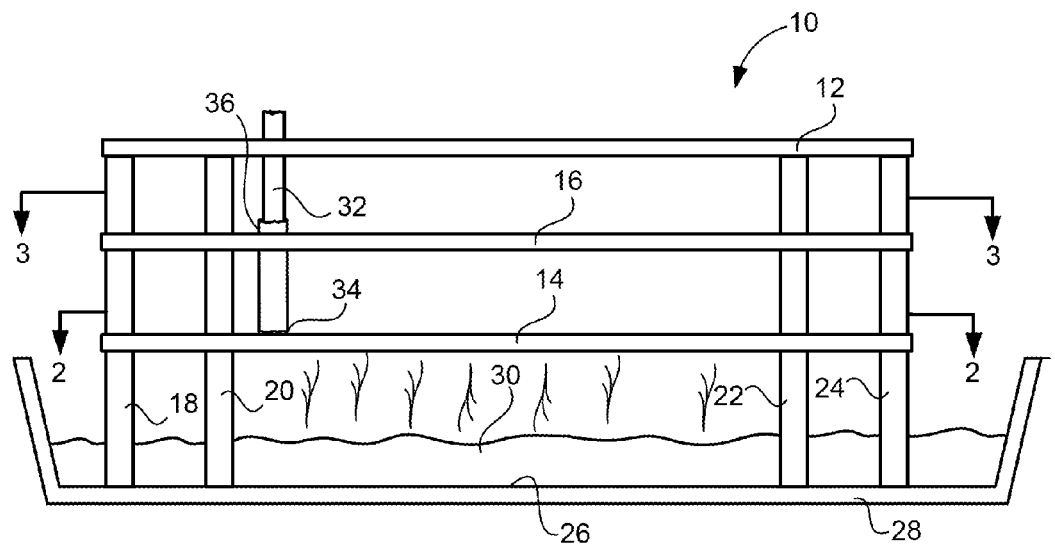
FIG. 1 is a side elevational view of the tamale steamer apparatus of the present invention as placed within a pan full of steaming water.

According to FIG. 1, there shown the tamale steamer apparatus 10 in accordance with the teachings of the present invention. The tamale steamer apparatus 10 includes a top rack 12, a bottom rack 14, and a central rack 16. A plurality of legs or supports 18, 20, 22 and 24 extend downwardly from at least the bottom rack 14 so as to support the racks 12, 14 and 16 in a generally horizontal orientation in parallel planar relationship with a surface 26 of a pan 28. Pan 28 is illustrated as having water 30 therein. The pan 28 can be placed upon a heating source so that the water 30 is boiled so as to produce steam which will flow upwardly through the bottom rack 14, through the central rack 16 and through the top rack 12. The tamale steamer apparatus 10 is located within the interior of the pan 28. It is removably positioned within the interior of the pan 28.

As can be seen in FIG. 1, a single tamale 32 is illustrated as extending through the top rack 12 and through the central rack 16. The bottom end 34 of the tamale 32 will rest upon the surface of the bottom rack 14. The tamale 32 is a conventional tamale having a husk 36 wrapped therearound. The husk is retained by the central rack 16 against the exterior surface of the tamale 32. As such, this arrangement allows the husk 32 to be maintained at a folded orientation so as to assure that the juices within the tamale 32 are retained within the interior of the husk and do not flow downwardly into the pan 28.

The supports 18, 20, 22 and 24 are illustrated as extending upwardly so as to support the top rack 12 and the central rack 16 in spaced parallel relationship to the bottom rack 14.

Figure 2:
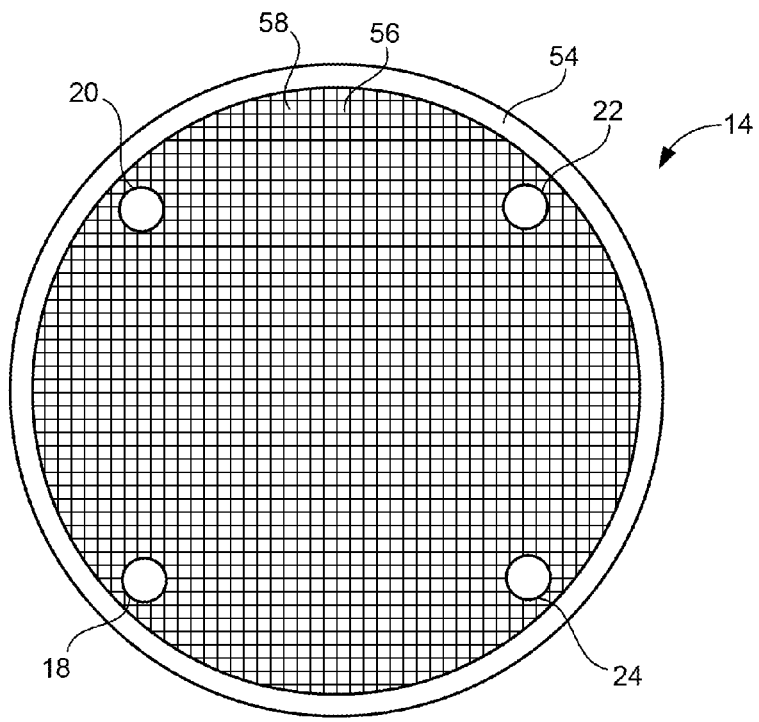
FIG. 2 is a cross-sectional view that is taken across lines 2-2 of FIG. 1 showing, in particular, the bottom rack.

FIG. 2 is a view of the bottom rack 14. It can be seen that the bottom rack 14 has a perimeter member 54 extending therearound. A plurality of wires 56 will extend in a cross-hatched pattern across the interior area of the perimeter member 54. Each of the openings 58 (that are defined by the cross-hatched pattern of the wires 56) will have a size that is less than the cross-sectional area of the tamale. As such, the bottom of the tamale can easily rest upon the top surface of the wires 56. The spacing of the wires allows steam to pass upwardly therethrough for the steaming of the tamale. Supports 18, 20, 22 and 24 are illustrated as extending through the bottom rack 14.

Figure 3:
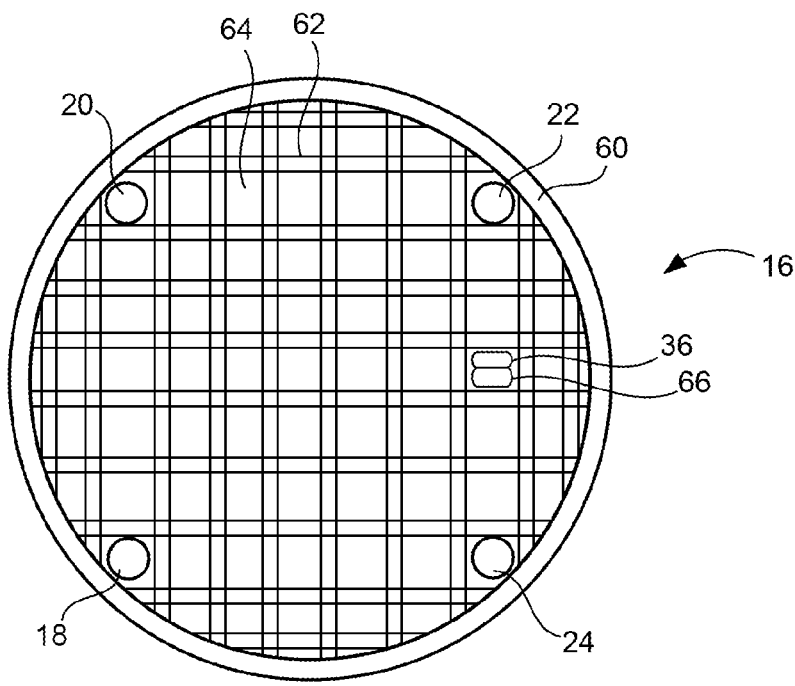
FIG. 3 is a cross-sectional view of the present invention as taken across lines 3-3 of FIG. 1 showing, in particular, the central rack of the tamale steamer apparatus of the present invention.

FIG. 3 is a cross-sectional view showing, in particular, the central rack 16. The central rack 16 also has a perimeter member 60. A plurality of relatively thick wires 62 will extend across the perimeter member 60 so as to define opening 64 arranged in a cross-hatched pattern. It can be seen that each of the openings 64 has an area greater than the cross-sectional area of the tamale 66 and greater than an area of the openings of the bottom rack. Tamale 66 is illustrated as having the husk 36 folded against the outer surface thereof. The arrangement of the wire 62 in the opening 64 assures that the husk 36 is retained in close proximity to the tamale 66. Supports 18, 20, 22 and 24 are arranged and shown as extending through the central rack 16. The central rack 16 can be affixed to the supports 18, 20, 22 and 24 in a conventional manner, such as adhesives or welding.

Figure 4:
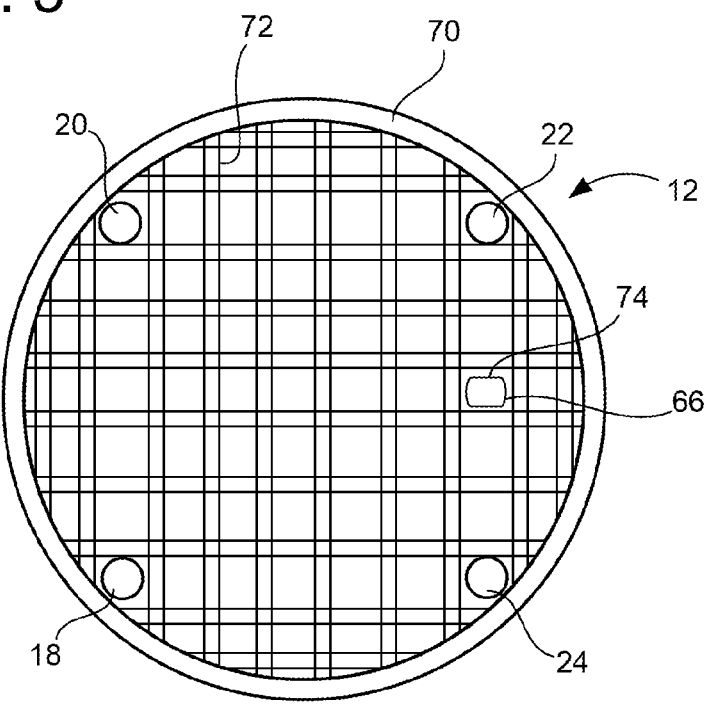
FIG. 4 is a plan view showing the tamale steamer apparatus of the present invention.

FIG. 4 is a plan view showing, in particular, the top rack 12. The top rack 12 also has a perimeter member 70 of a generally circular configuration. Wires 72 arranged in a cross-hatched pattern so as to define openings 74. The tamale 66 is illustrated as received within the opening 74. The opening 74 has an area greater than the cross-sectional area of the tamale 66 and an area greater than an area of the opening of the bottom rack 14. Each of the supports 18, 20, 22 and 24 is illustrated as opening at the top rack 12. As such, they are available to receive the bottom of supports of another tamale steamer.

Figure 5:
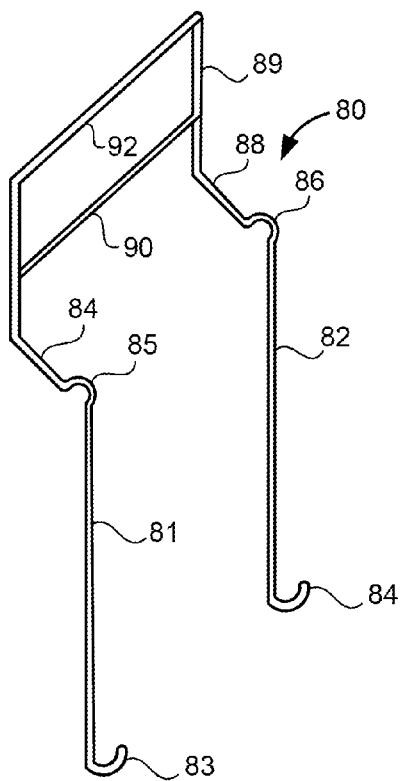
FIG. 5 is a perspective view of a handle that can be used for the lifting and manipulating of the tamale streamer apparatus.

FIG. 5 is perspective view of the handle 80. The handle 80 can be attached to the wires openings of the top rack 12 so as to allow the tamale steamer apparatus 10 to be removed from the pan. In FIG. 5, it can be seen that the handle 80 includes a first vertical member 81 and a second vertical member 82. The first vertical member 81 has a hook 83 formed at the bottom end thereof. The second vertical member 82 has a hook 84 formed at the bottom end thereof. Hooks 83 and 84 are in the form of a loop that can extend so as to conform with the outer diameter of the wires that are used for the formation of the plurality of openings of the rack. As such, the hooks 83 and 84 can lift the tamale steamer apparatus 10 from the pan.

A first bent portion 85 is formed at an upper end of the first vertical member 81. A second bent portion 86 is formed at the upper end of the second vertical member 82. Bent portions 85 and 86 have a curvature which is suitable for conforming to the outer diameter of the perimeter member of the top rack 12. As such, when the hooks 83 and 84 engage with the wires of the top rack, the bent portions 85 and 86 will rest upon the outer surface of the perimeter member of the top rack.

An first angled portion 87 extends from the first bent portion 85. A second angled portion 88 extends from the second bent portion 86. These angled portions 87 and 88 extend toward a gripping portion 89. The gripping portion 89 is located at the upper end of the handle 80. In the preferred embodiment of the present invention, the gripping portion 89 includes a first horizontal bar 90 and a second horizontal bar 92. As such, a hand can be used so as to grip the horizontal bars 90 and 92. A lifting force can be applied to the handle 80 so as to lift the tamale steamer apparatus 10 from the underlying pan.

Figure 6:
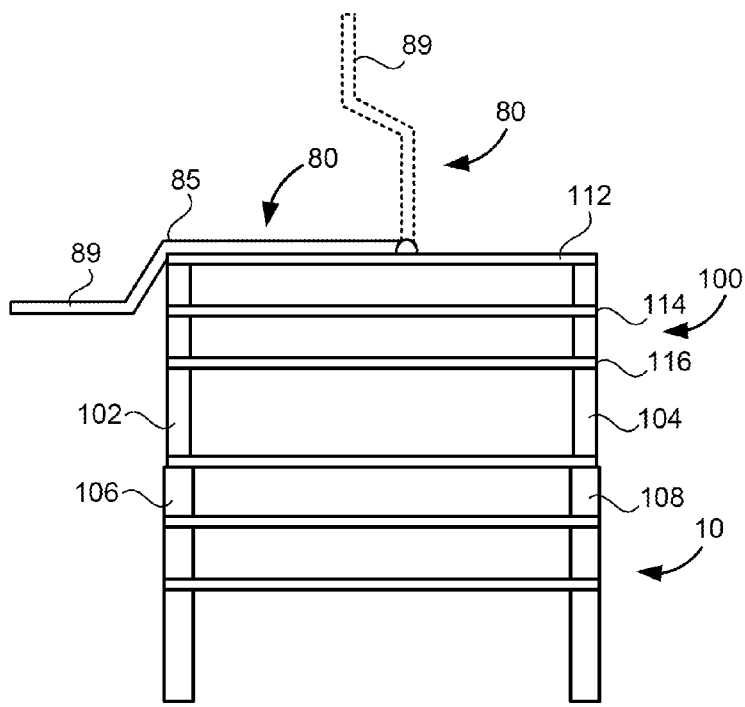
FIG. 6 is a side elevational view showing the manner in which one tamale steamer apparatus can be stacked upon another tamale steamer apparatus.

FIG. 6 shows the tamale steamer apparatus 10 of the present invention as having another tamale steamer apparatus 100 placed thereupon. As can be seen, the supports 102 and 104 of the tamale steamer apparatus 100 are received in the open upper end of the respective supports 106 and 108 of the tamale steamer apparatus 10. The handle 80 is illustrated as having hooks 83 and 84 engaged with a wire of the top rack 112. The handle 80 is movable between a position extending generally horizontally (as shown in solid lines). The gripping portion 89 extends outwardly beyond the support 102 so as to be beyond the steam flowing upwardly from the pan. As such, the gripping portion will remain relatively cool. The bend portion 85 will rest upon a perimeter member of the top rack 112 so as to provide a pair of contacts in order to maintain the handle 80 in a horizontal orientation. The handle can be physically moved to a vertical orientation (as shown in broken lines) so as to allow the gripping portion 89 can be used to lift the tamale steamer apparatus 100 from the pan.

As can be seen in FIG. 5, if it is necessary to steam additional tamales, then the second tamale steamer apparatus 100 can be placed above the first tamale steamer apparatus 10 so as to have a stacked arrangement.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for steaming at least one tamale, the apparatus comprising:
   a top rack having a plurality of openings formed therein, said top rack extending in a generally horizontal orientation, said plurality of openings defined by a first plurality of straight wires extending across a transverse second plurality of straight wires such that said first and second pluralities of straight wires creates a cross-hatched configuration;

a bottom rack having a plurality of openings formed therein, each of said plurality of openings of said bottom rack having an area less than an area of each of said plurality of openings of said top rack, said bottom rack extending in a generally horizontal orientation in spaced relation to said top rack, said plurality of openings of said bottom rack defined by a first plurality of straight wires extending across a transverse second plurality of straight wires so as to create another cross-hatched configuration, said plurality of openings of said top rack being arranged such that the tamale extends vertically between said top rack and said bottom rack, each of plurality of openings of said bottom rack having an area less than a cross-sectional area of an end of the tamale at said bottom rack such that the end of the tamale is supported on a top surface of said bottom rack; and at least one leg extending downwardly from said bottom rack so as to support said bottom rack a desired distance above an underlying surface.

2. The apparatus of claim 1, further comprising:
a central rack having a plurality of openings formed therein, said central rack extending in a generally horizontal orientation in a location between said top rack and said bottom rack.

3. The apparatus of claim 2, each of said plurality of openings of said central rack having an area greater than an area of each of said plurality of openings of said bottom rack.

4. The apparatus of claim 1, further comprising:
a pan positioned below said bottom rack, said pan being the underlying surface, said at least one leg abutting a surface of said pan.

5. The apparatus of claim 1, the area of each of said plurality of openings of said top rack being greater than a cross-sectional area of the tamale.

6. The apparatus of claim 1, further comprising:
a plurality of supports extending in a vertical orientation between said top rack and said bottom rack so as to maintain said top rack and said bottom rack in spaced parallel relationship to each other.

7. The apparatus of claim 1, said at least one leg comprising:
a plurality of legs extending downwardly from said bottom rack, said plurality of legs positioned adjacent to a perimeter of said bottom rack.

8. The apparatus of claim 1, further comprising:
a handle affixed to at least one of said top rack and said bottom rack, said handle having a gripping portion extending above said top rack.

9. The apparatus of claim 8, said handle comprising:
a first vertical member having a hook at a lower end thereof; and
a second vertical member having a hook at a lower end thereof, said first vertical member being in spaced parallel relation to said second vertical member, said first and second vertical members being connected to said gripping portion.

10. The apparatus of claim 9, said handle further comprising:
a first bent portion formed at an upper end of said first vertical member;
a first angled portion extending from said bent portion to said gripping portion;
a second bent portion formed at an upper end of said second vertical member; and
a second angled portion extending from said second bent portion to said gripping portion.

11. An apparatus for steaming at least one tamale, the apparatus comprising:
a top rack having a plurality of openings formed therein, said top rack extending in a generally horizontal orientation, said plurality of openings defined by a first plurality of straight wires extending across a transverse second plurality of straight wires such that said first and second pluralities of straight wires creates a cross-hatched configuration;

a bottom rack having a plurality of openings formed therein, each of said plurality of openings of said bottom rack having an area less than an area of each of said plurality of openings of said top rack, said bottom rack extending a generally horizontal orientation in spaced relation to said top rack, said plurality of openings of said bottom rack defined by a first plurality of straight wires extending across a transverse second plurality of straight wires so as to create another cross-hatched configuration, said plurality of openings of said top rack being arranged such that the tamale extends vertically between said top rack and said bottom rack, each of plurality of openings of said bottom rack having an area less than a cross-sectional area of an end of the tamale at said bottom rack such that the end of the tamale is supported on a top surface of said bottom rack;

at least one leg extending downwardly from said bottom rack so as to support said bottom rack a desired distance above an underlying surface; and a handle affixed to at least one of said top rack and said bottom rack, said handle having a gripping portion extending outwardly of or above said top rack.

12. The apparatus of claim 11, said handle comprising:
a first vertical member having a hook at a lower end thereof; and
a second vertical member having a hook at a lower end thereof, said first vertical member being in spaced parallel relation to said second vertical member, each of said first and second vertical members being connected to said gripping portion.

13. The apparatus of claim 12, said handle further comprising:
a first bent portion formed at an upper end of said first vertical member;
a first angled portion extending from said first bent portion to said gripping portion;
a second bent portion formed at an upper end of said second vertical member; and
a second angled portion extending from said second bent portion to said gripping portion.

* * * * *